United States Patent
Song et al.

(10) Patent No.: US 11,397,010 B2
(45) Date of Patent: Jul. 26, 2022

(54) HEATING ADJUSTMENT METHOD AND DEVICE

(71) Applicant: Qingdao Haier Air Conditioner General Corp., Ltd., Shandong (CN)

(72) Inventors: Shifang Song, Shandong (CN); Li Guo, Shandong (CN); Yongfu Cheng, Shandong (CN); Dong Chen, Shandong (CN)

(73) Assignee: QINGDAO HAIER AIR CONDITIONER GENERAL CORP. LTD., Shandong (CN)

( * ) Notice: Subject to any disclaimer, the term of this patent is extended or adjusted under 35 U.S.C. 154(b) by 188 days.

(21) Appl. No.: 16/604,954

(22) PCT Filed: Mar. 2, 2018

(86) PCT No.: PCT/CN2018/077849
§ 371 (c)(1),
(2) Date: Oct. 11, 2019

(87) PCT Pub. No.: WO2018/192307
PCT Pub. Date: Oct. 25, 2018

(65) Prior Publication Data
US 2020/0158350 A1 May 21, 2020

(30) Foreign Application Priority Data
Apr. 18, 2017 (CN) .......................... 201710254028.1

(51) Int. Cl.
*F24D 19/10* (2006.01)
*F24D 11/02* (2006.01)
(Continued)

(52) U.S. Cl.
CPC ...... *F24D 19/1009* (2013.01); *F24D 11/0214* (2013.01); *F24F 11/50* (2018.01);
(Continued)

(58) Field of Classification Search
CPC .. F24D 19/1009; F24D 11/0214; F24D 10/00; F24D 19/1012; F24F 2110/12;
(Continued)

(56) References Cited

U.S. PATENT DOCUMENTS 4,775,944 A * 10/1988 Nakamura ......... G05D 23/1917
700/277
8,276,829 B2 * 10/2012 Stoner ................ G05D 23/1934
236/1 C
(Continued)

FOREIGN PATENT DOCUMENTS

CN      101074790 A    11/2007
CN      103363585 A    10/2013
(Continued)

OTHER PUBLICATIONS

Mu, CN101074790A English machine translation, Nov. 21, 2007 (Year: 2007).*
(Continued)

*Primary Examiner* — Steven S Anderson, II
*Assistant Examiner* — Phillip Decker
(74) *Attorney, Agent, or Firm* — Calfee, Halter & Griswold LLP

(57) ABSTRACT

The present disclosure discloses a heating adjustment method and device, which belongs to the field of thermal system management technologies. The method includes: calculating an average indoor temperature of a cell, wherein the average indoor temperature of the cell is an average value of a real-time indoor temperature of each dwelling unit in the cell; judging whether the average indoor temperature is within a standard temperature range; and adjusting at least one of a water pump flow and a water temperature supplied to the cell when the average indoor temperature is not within the standard temperature range. When the average indoor
(Continued)

---

Calculate an average indoor temperature of a community

Determine whether the average indoor temperature is within a standard temperature value range When the average indoor temperature is not within the standard temperature value range, regulate at least one of a water pump flow and a water temperature supplied to the community temperature of the current cell is abnormal, the temperature of the cell is restored to a standard value by adjusting the water pump flow and the water temperature for heating, thus the response speed is fast, the reliability is high, the user experience is improved and energy is saved.

13 Claims, 3 Drawing Sheets

(51) Int. Cl.
  *F24F 11/50*  (2018.01)
  *G05D 23/19*  (2006.01)
  *G08B 19/00*  (2006.01)
  *F24F 110/12*  (2018.01)

(52) U.S. Cl.
  CPC ......... *G05D 23/1934* (2013.01); *G08B 19/00* (2013.01); *F24D 2220/042* (2013.01); *F24F 2110/12* (2018.01)

(58) Field of Classification Search
  CPC ....... F24F 11/50; F24F 2130/10; G08B 19/00; G05D 23/1934; Y02B 30/17
  See application file for complete search history.

(56) References Cited

U.S. PATENT DOCUMENTS

| | | | |
|---|---|---|---|
| 10,386,795 B2* | 8/2019 | Vega | F24F 11/62 |
| 2010/0045470 A1 | 2/2010 | Araiza et al. | |

FOREIGN PATENT DOCUMENTS

| | | |
|---|---|---|
| CN | 103471175 A | 12/2013 |
| CN | 103836721 A | 6/2014 |
| CN | 104534634 A | 4/2015 |
| CN | 104658222 A | 5/2015 |
| CN | 104713666 A | 6/2015 |
| CN | 104728924 A | 6/2015 |
| CN | 104930589 A | 9/2015 |
| CN | 205119226 U | 3/2016 |
| CN | 105737256 A | 7/2016 |
| CN | 107166504 A | 9/2017 |
| CN | 107192003 A | 9/2017 |
| CN | 107270384 A | 10/2017 |
| DE | 10057834 A1 | 6/2002 |
| DE | 102010055080 A1 | 6/2012 |
| DE | 102014011311 A1 | 2/2015 |
| EP | 085466 A1 | 8/1983 |
| EP | 1564616 A2 | 8/2005 |
| EP | 2154437 A1 | 2/2010 |

OTHER PUBLICATIONS

Hu, et al., CN205119226U English machine translation, Mar. 30, 2016 (Year: 2016).*
Brauns, DE10057834A1 English machine translation, Jun. 6, 2002 (Year: 2002).*
Search Report from Chinese Application No. 2017102540281 dated Apr. 1, 2019.
Search Report from European Application No. 18788404.4 dated Jan. 27, 2020.
Office Action from Chinese Application No. 201710254028.1 dated Feb. 28, 2020.
International Search Report from International Application No. PCT/CN2018/077849 dated Jun. 6, 2018.
Office Action from Chinese Application No. 201710254028.1 dated Apr. 1, 2019.
Office Action from Chinese Application No. 201710254028.1 dated Sep. 11, 2019.
International Preliminary Report on Patentability from International Application No. PCT/CN2018/077849 dated Oct. 22, 2019.

* cited by examiner

HEATING ADJUSTMENT METHOD AND DEVICE

CROSS-REFERENCE TO RELATED APPLICATIONS

The application is a U.S. national phase of International Application No. PCT/CN2018/077849, filed Mar. 2, 2018, which is based upon and claims priority to Chinese Patent Application No. 201710254028.1, filed Apr. 18, 2017, the entire contents of which are incorporated herein by reference.

TECHNICAL FIELD

The present disclosure relates to the field of thermal system management technologies, and more particularly, to a heating adjustment method and device.

BACKGROUND

In the north, when heating is carried out in winter, a standard indoor temperature for central heating specified by the State is 18° C.±2° C. However, a heating company cannot monitor actual indoor temperatures of each cell and each dwelling unit, and only makes general adjustments according to experience and weather conditions, which often results that the heating is not up to a standard or exceeds the standard. During a whole heating season, some dwelling units have to open windows when the indoor temperature is more than 26° C., while others often complain when the indoor temperature is less than 16° C.

SUMMARY

In order to overcome problems in the related art, the present disclosure provides a heating adjustment method, including:

calculating an average indoor temperature of a cell, wherein the average indoor temperature of the cell is an average value of a real-time indoor temperature of each dwelling unit in the cell;

judging whether the average indoor temperature is within a standard temperature range; and adjusting at least one of a water pump flow and a water temperature supplied to the cell when the average indoor temperature is not within the standard temperature range.

On the other hand, the present disclosure provides a heating adjustment device, including:

a processor; and a memory for storing instructions executable by the processor;

wherein the processor is configured to:

calculate an average indoor temperature of a cell, wherein the average indoor temperature of the cell is an average value of a real-time indoor temperature of each dwelling unit in the cell;

judge whether the average indoor temperature is within a standard temperature range; and adjust at least one of a water pump flow and a water temperature supplied to the cell when the average indoor temperature is not within the standard temperature range.

On the other hand, the present disclosure provides a non-transitory computer-readable storage medium comprising instructions that, when executed by a processor of a heating adjustment device, cause the heating adjustment device to perform a method including:

calculating an average indoor temperature of a cell, wherein the average indoor temperature of the cell is an average value of a real-time indoor temperature of each dwelling unit in the cell;

judging whether the average indoor temperature is within a standard temperature range; and adjusting at least one of a water pump flow and a water temperature supplied to the cell when the average indoor temperature is not within the standard temperature range.

It should be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

The following description and accompanying drawings fully illustrate the specific implementation solutions of the present disclosure so that a person skilled in the art can practice them. The embodiments merely represent possible changes. Unless otherwise specified explicitly, the individual component and function are optional and the operation sequence may be changed. Parts and characteristics of some implementation solutions may be included in or replace parts and characteristics of other implementation solutions. The scope of the implementation solutions of the present disclosure includes the whole scope of the claims and all available equivalents of the claims. As used herein, each implementation solution may be independently or generally expressed by "present disclosure", which is merely for convenience. As a matter of fact, if more than one disclosure is disclosed, it does not mean that the scope of the application is automatically limited to any single disclosure or disclosure concept. As used herein, terms such as "first" and "second" are merely for distinguishing one entity or operation from another entity or operation and do not require or imply any actual relationship or sequence among these entities or operations. Moreover, terms such as "comprise" and "include" or any other variants indicate a non-exclusive inclusion, so that a process, method or device including a series of elements not only include these elements, but also include other elements not explicitly listed. As used herein, each embodiment is described progressively, and contents focally described in each embodiment are different from those in other embodiments. The same or similar parts among each of the embodiments may be referred to each other. Regarding a structure, a product and the like disclosed in the embodiments, since they are corresponding to parts disclosed in the embodiments, their description is relatively simple and relevant contents can be referred to the description in the method part.

Figure 1:
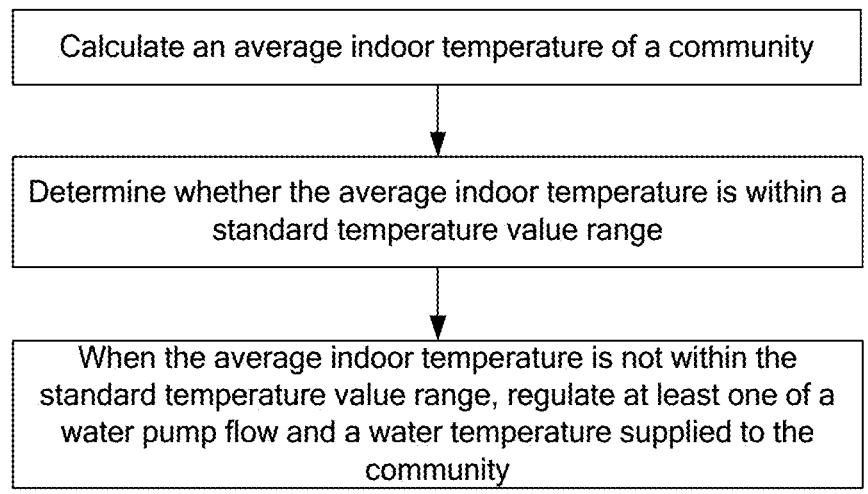
FIG. 1 is a flowchart illustrating a heating adjustment method according to an exemplary embodiment.

FIG. 1 is a flowchart illustrating a heating adjustment method according to an exemplary embodiment. As shown in FIG. 1, the method includes:

calculating an average indoor temperature of a cell, wherein the average indoor temperature of the cell is an average value of a real-time indoor temperature of each dwelling unit in the cell;

judging whether the average indoor temperature is within a standard temperature range; and adjusting at least one of a water pump flow and a water temperature supplied to the cell when the average indoor temperature is not within the standard temperature range.

For example, a cell A has 200 dwelling units, the average indoor temperature of the cell may be the arithmetic mean of indoor temperatures of all the dwelling units, or may also be the truncated average value of the indoor temperatures of all the dwelling units. Using the truncated average value can effectively prevent the influence brought by the abnormal temperature of individual dwelling units in the cell A. For example, a dwelling unit m is very afraid of cold, an air conditioner is turned on based on the heating of the house, and a temperature setting is high, while radiators in a dwelling unit n are aging, or an installation area of the radiators is very small, and thus the indoor temperature is relatively low.

According to "Civil building energy-saving design standard" and "Code for design of heating ventilation and air conditioning", an indoor standard temperature is 18° C.±2° C. However, implementation standards of various provinces and regions are slightly different, and individual cities have reached 20° C.±2° C.

According to research results of the health department, when a human body is properly dressed, fully warm and in a quiet state, the indoor temperature is relatively comfortable at 20° C., no cold feeling at 18° C., and 15° C. is a temperature limit that produces obvious cold feeling. Therefore, in order to improve the quality of life and meet requirements of adjustable room temperature, the indoor temperature range of the main room of civil buildings is set at 18° C. to 24° C. according to China's relevant specifications. It can be seen from actual survey results, a design temperature for heating in most buildings is 18° C. to 20° C.

In this embodiment, the standard temperature range may be set according to regional environmental differences and local policies, but the lowest temperature of the range is not less than 16° C., and the highest temperature is not higher than 24° C. to avoid unnecessary energy waste.

Taking the standard temperature range of 18° C. to 22° C. as an example, when it is detected that the average indoor temperature of the cell A is 16° C., it is determined that the indoor temperature of the cell A is not up to standard, and the heating system of the cell A needs to be adjusted.

The main parameters affecting the indoor temperature in the heating system include the outdoor temperature, the water pump flow and the water temperature. It can be seen from the calculation formula of 7.1.1 design flow in CJJ 34-2010 "Urban heating pipe network design specifications" that a heat load, the flow and the temperature are as follows:

$$G = 3.6 \frac{Q}{c(t_1 - t_2)}.$$

In the formula:
"G" represents the design flow, t/h;
"Q" represents the heat load, kW;
"c" represents specific heat capacity of water, kJ/kg·° C.; (generally 4.1868)
"$t_1$" represents a water supply temperature, ° C.;
"$t_2$" represents a return water temperature, ° C.
That is, the heat load is:

$$Q = c(t_1 - t_2)G/3.6$$

It can be seen that the heat load Q is proportional to the flow G and the difference ($t_1 - t_2$) between the water supply temperature and the return water temperature.

The main parameters affecting the heat load include, but are not limited to, a height of the building, a heat transfer coefficient of building materials, building area with different orientations, the indoor temperature and the outdoor temperature. In the existing cell, parameters of the building itself have been fixed, and thus the heat load Q can be obtained by the following formula:

$$Q = abV(t_{np} - t_w).$$

The parameter a represents a temperature correction coefficient corresponding to different outdoor temperatures. For example:

| Outdoor temperature ° C. | Correction coefficient a |
|---|---|
| 0 | 2.05 |
| −5 | 1.67 |
| −10 | 1.45 |

The parameter b represents a building correction coefficient corresponding to the building materials, orientations and uses of different buildings (for example, a temperature of a toilet should be slightly higher than that of a bedroom). V represents the contour volume of the building, $t_{np}$ represents the average indoor temperature, and $t_w$ represents the outdoor temperature.

It can be seen that, $abV(t_{np} - t_w) = c(t_1 - t_2)G/3.6$.

The difference ($t_1 - t_2$) between the water supply temperature and the return water temperature is generally determined by a heat sink area of the dwelling unit. However, for the dwelling units at the end of the heating system, if the water supply temperature is too low, when the water reaches these dwelling units, the water temperature is already very low, it is not guaranteed that these dwelling units can reach the set temperature difference, and thus the indoor temperature of these dwelling units is also greatly affected.

It can be seen that, in the case of a known outdoor temperature, the indoor temperature can be adjusted by adjusting the water supply temperature and the water pump flow of the cell. Whether the water supply temperature or the water pump flow is adjusted individually or simultaneously, the indoor temperature can be adjusted and controlled.

According to this embodiment, by determining whether the heating of the cell is within the normal range, the cell which does not meet the heating standard or seriously exceeds the heating standard can be found in time, and the temperature of the cell can be adjusted and controlled.

In an embodiment, the real-time indoor temperature of each dwelling unit in the cell collected by a wireless communication module in a smart air conditioner can be obtained, and then the average indoor temperature of the cell is calculated.

The wireless communication module may be a WiFi module, a 2.4G wireless module, a ZigBee module, an optical module, or other wireless transceiver module. The present disclosure is not limited.

Taking the WiFi module as an example, the smart air conditioner device has a function of measuring the indoor temperature, and can obtain the indoor temperature of the dwelling unit in real time by using the WiFi module in the smart air conditioner itself, so as to avoid installing a new temperature measuring module in the dwelling unit, and thus the layout cost is reduced, and the stability and penetration are high. Compared with the traditional dwelling unit temperature measurement, a lot of manpower and material resources are saved, and the reliability is improved.

In an embodiment, the WiFi module in the smart air conditioner can report the indoor temperature to the server every hour. According to the big data analysis of the smart air conditioner, a reporting interval can be adjusted according to the new and old condition of the cell or the temperature compliance rate. For example, if it is obtained that the average indoor temperature of the cell A is often less than 16° C. based on the air conditioning big data, the cell A can be taken as a key object for adjustment and control, and the smart air conditioner of the dwelling unit in the cell can report the data of the indoor temperature to the server every half an hour; the server can analyze the data of the cell A, and adjust the water pump flow or the water temperature supplied to the cell A in time; or simultaneously adjust the water pump flow and the water temperature supplied to the cell A, and obtain the feedback timely.

In an embodiment, if the average indoor temperature of a cell is within the standard temperature range in one detection, the frequency of the data reported by the smart air conditioner of the dwelling unit in the cell can be reduced. For example, in one detection, the average indoor temperature of a cell B is calculated to be 20° C. according to the real-time indoor temperature of each dwelling unit, and thus the average indoor temperature of the cell B can be detected again after two hours; if the average indoor temperature is still the standard temperature, the average indoor temperature of the cell is detected again after four hours, and so on. In an embodiment, the detection interval may be set to not exceed six hours, so as to prevent sudden device failure or heating accident.

This is beneficial to distinguish between key monitoring cells and standard temperature cells, and reasonably plan the frequency of the data reported by the smart air conditioner, thereby reducing the storage and processing of data to some extent, and saving energy.

The existing database of the air conditioning big data stores a large amount of historical data. In an embodiment, a positive correlation between the average indoor temperature of the cell and the outdoor temperature, the water pump flow and the water temperature can be established based on the historical data.

There are many factors affecting the indoor temperature, although it can be known that the correlation between the average indoor temperature and the water pump flow and the water temperature is generally positive correlation when the outdoor temperature is constant, the specific correlation cannot be quantitatively obtained. By using the big data to analyze the historical data to obtain values of the average indoor temperature, the outdoor temperature, the water pump flow and the water temperature of the cell, an appropriate mathematical model can be established, and thus the quantitative analysis and adjustment of the average indoor temperature can be realized.

In an embodiment, the positive correlation between the average indoor temperature and the outdoor temperature, the water pump flow and the water temperature is trained by a decision tree algorithm. When the heating system adjusts the water pump flow or the water temperature, the adjustment amount of at least one of the water pump flow and the water temperature may be determined according to the current outdoor temperature and the positive correlation.

The huge user base of the existing smart air conditioner has accumulated a large amount of air conditioning data, the positive correlation between the indoor temperature and the outdoor temperature, the water pump flow and the water temperature is established based on these data. By adjusting the water pump flow and/or the water temperature quantitatively, the fine adjustment and control of the heating system is realized, and the energy waste caused by repeated fine adjustment is avoided.

In an embodiment, the outdoor temperature is obtained by the following steps: determining a geographical location of the cell; and obtaining meteorological data corresponding to the geographical location, wherein temperature information contained in the meteorological data is the outdoor temperature.

By using a real-time sharing of Internet data, the meteorological data accurate to the cell obtained through a cloud platform is more reliable and richer, thereby avoiding the waste of manpower and material resources caused by arranging a temperature collection module.

In another embodiment, the outdoor temperature can be sensed by a temperature sensor in an outdoor unit of the smart air conditioner and uploaded to the server through the wireless communication module in the smart air conditioner.

In an embodiment, if the water pump flow or the water temperature of the cell has reached the threshold value, but the average indoor temperature of the cell is still beyond the normal range, an abnormal situation is determined, the server sends an alarm and prompts the location of the abnormal cell. For example, according to a regulation of heating water flow, the flow should be less than 0.8 m/s when a pipe diameter of a heating pipeline is 15 mm, the flow should be less than 1.0 m/s when the pipe diameter is 20 mm, and the flow should be less than 1.2 m/s when the pipe diameter is 25 mm. When the adjustment of the water flow has exceeded the above threshold value, and the indoor temperature is still not within the standard range, the heating system of the cell appears failure. According to the regulation of heating water temperature:

| Outdoor minimum temperature ° C. | Return water temperature ° C. | Water supply temperature ° C. |
| --- | --- | --- |
| 5~10 | 35 | 40 |
| 3~5 | 45 | 50~55 |
| 0~3 | 42 | 55~60 |
| −2~0 | 55 | 60~65 |
| −5~−2 | 60 | 65~70 |
| less than −5 | 60 | 65~70 |

If the water supply temperature has exceeded the above threshold value, but the average indoor temperature of the cell is still not within the standard range, the heating system of the cell appears failure.

By monitoring the average indoor temperature and the water pump flow and the water supply temperature, a fault point can be found in time, which is convenient for the staff to check in time.

In the above embodiment, the heating temperature is adjusted by taking the cell as a whole. In an embodiment, for each dwelling unit in the cell, after the average indoor temperature of the cell is obtained, a difference between the real-time indoor temperature of each dwelling unit in the cell and the average indoor temperature of the cell may also be calculated. If an absolute value of the difference is greater than a preset threshold value, there may be a heating abnormality in the corresponding dwelling unit. For example, the average indoor temperature of the cell A is 20° C., 4° C. is a preset abnormal threshold value, the indoor temperature of a cell m is 10° C., and the absolute value of the difference between the indoor temperature of the cell m and the average indoor temperature is 10° C., thus it is considered that the heating of the cell m is abnormal, and the server will prompt the abnormal situation and display the specific location of the cell m, so that the staff can check the abnormality.

Figure 2:
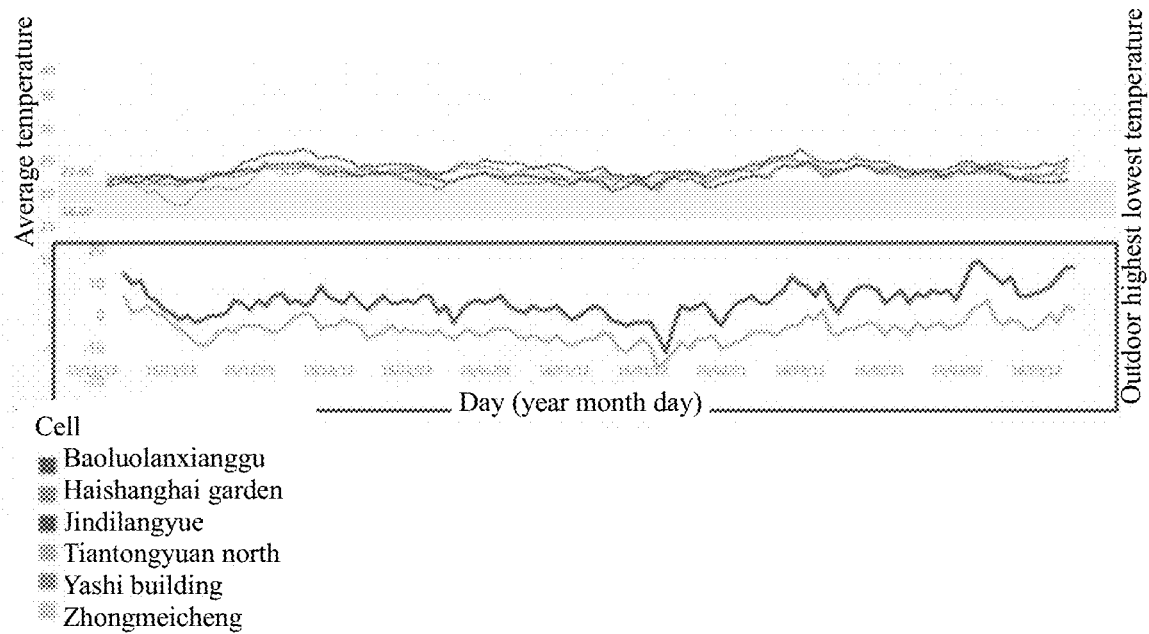
FIG. 2 is a trend curve of average indoor temperature and outdoor temperatures of six cells based on air conditioning big data.

FIG. 2 shows a trend curve of average indoor temperature and outdoor temperatures of six cells based on air conditioning big data. As shown in FIG. 2, the ordinate of the graph is temperature and the abscissa of the graph is date, and the graph records a trend of an average indoor temperature of the six cells from Nov. 13, 2015 to Mar. 2, 2016. The average indoor temperature of the six cells is mainly distributed between 22° C. and 25° C. Two curves in the frame line of FIG. 2 record temperature changes of the outdoor weather from Nov. 13, 2015 to Mar. 2, 2016, in which the upper curve records the highest temperature of the day, and the lower curve records the lowest temperature of the day. It can be seen from FIG. 2 that, the trend of the average indoor temperature curve of each cell is very close; and it can be seen from the comparison with the temperature changes of the outdoor weather that, the average indoor temperature of each cell is related to the outdoor temperature, that is, the indoor temperature is extremely susceptible to the outdoor temperature without interfering with heating.

It can be seen, the change of the indoor temperature can be predicted in advance by the change of the outdoor temperature.

Figure 3:
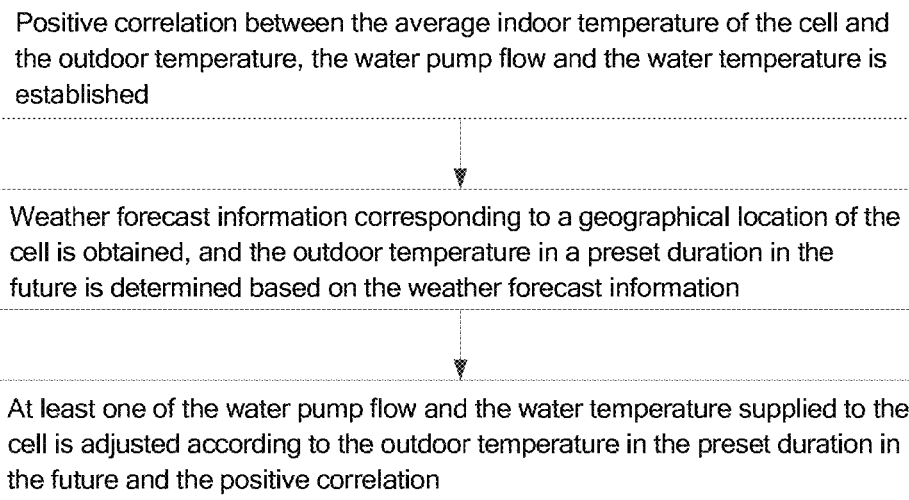
FIG. 3 is a flowchart illustrating a heating adjustment method according to an exemplary embodiment.

In another embodiment, as shown in FIG. 3, the heating adjustment method includes the following steps:

obtaining the positive correlation between the average indoor temperature of the cell and the outdoor temperature, the water pump flow and the water temperature based on the database of the air conditioning big data;

obtaining weather forecast information corresponding to a geographical location of the cell, and determining the outdoor temperature in a preset duration in the future based on the weather forecast information; and adjusting at least one of the water pump flow and the water temperature according to the outdoor temperature in the preset duration in the future and the positive correlation.

As described above, the positive correlation can be established by modeling the historical data in the database of the air conditioning big data to establish a positive correlation between the average indoor temperature and the outdoor temperature, the water pump flow and the water temperature. When the water pump flow or the water temperature is adjusted by the heating system, the adjustment amount of the water pump flow and/or the water temperature may be determined according to a future temperature predicted by the weather forecast and the positive correlation, and thus the adjustment and control of the temperature in advance is realized, the indoor temperature of the dwelling unit is kept constant, and the user experience is improved.

According to the current short-term weather forecast information, the forecast information shows the temperature every three hours. In an embodiment, three hours can be set as the preset duration, the outdoor temperature of an area where the cell is located in the next three hours can be obtained in advance, according to the outdoor temperature and the positive correlation, the water pump flow and the water temperature information corresponding to the average indoor temperature being kept constant can be obtained and adjusted in time.

In another embodiment, outdoor temperature prediction information of the area where the cell is located in the future day can be obtained with one day as the preset duration according to the short-term weather forecast of the area where the cell is located. A weighted average value of the highest temperature and the lowest temperature in the future day is taken as the outdoor temperature information, according to the above positive correlation, the water pump flow and the water temperature information corresponding to the average indoor temperature being kept constant can be obtained and adjusted in time. By using the weighted average value, a weighted coefficient can be adjusted according to a length of day and night, so that the calculation of the outdoor temperature can more accurately reflect the temperature situation in the future day.

Figure 4:
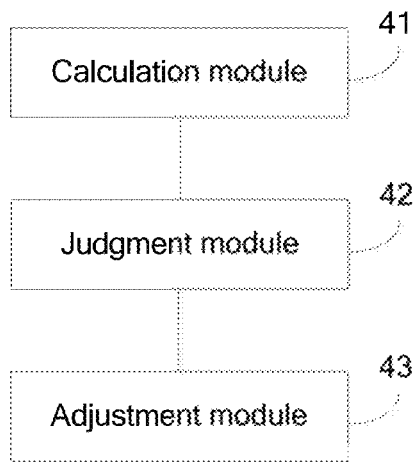
FIG. 4 is a structural block diagram illustrating a heating adjustment device according to an exemplary embodiment.

FIG. 4 is a block diagram illustrating a heating adjustment device according to an exemplary embodiment. As shown in FIG. 4, the device includes a calculation module 41, a judgment module 42 and an adjustment module 43.

The calculation module 41 is configured to calculate an average indoor temperature of a cell, wherein the average indoor temperature of the cell is an average value of a real-time indoor temperature of each dwelling unit in the cell.

The judgment module 42 is configured to judge whether the average indoor temperature is within a standard temperature range.

The adjustment module 43 is configured to adjust a water pump flow and/or a water temperature supplied to the cell when the average indoor temperature is not within the standard temperature range.

According to the heating adjustment device provided by the embodiment, by using the judgment module to determine whether the average indoor temperature of the cell calculated by the calculation module is within the normal range, the cell which does not meet a heating standard or seriously exceeds the heating standard can be found in time, and the temperature of the cell can be adjusted and controlled by the adjustment module.

The device shown in FIG. 4 is used to implement the method flow shown in FIG. 1, and the related content descriptions are the same, which are not described here.

Figure 5:
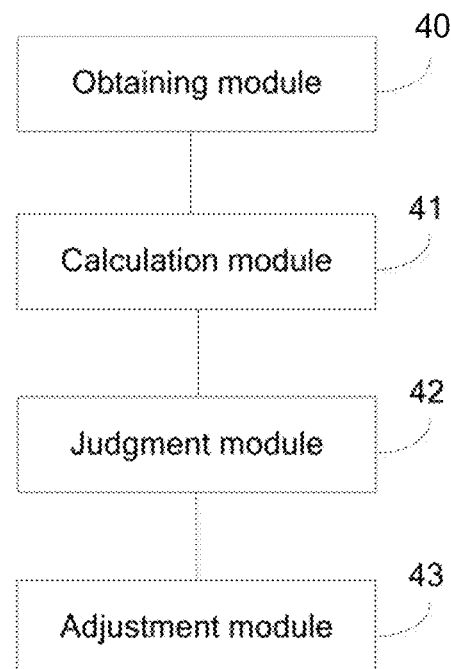
FIG. 5 is a structural block diagram illustrating a heating adjustment device according to an exemplary embodiment.

FIG. 5 is a block diagram illustrating a heating adjustment device according to an exemplary embodiment. As shown in FIG. 5, on the basis of the embodiment shown in FIG. 4, the device may further include an obtaining module 40.

The obtaining module 40 is configured to obtain the real-time indoor temperature of each dwelling unit in the cell collected by a wireless communication module in a smart air conditioner.

The calculation module 41 calculates the average indoor temperature of the cell according to the real-time indoor temperature of each dwelling unit obtained by the obtaining module.

Figure 6:
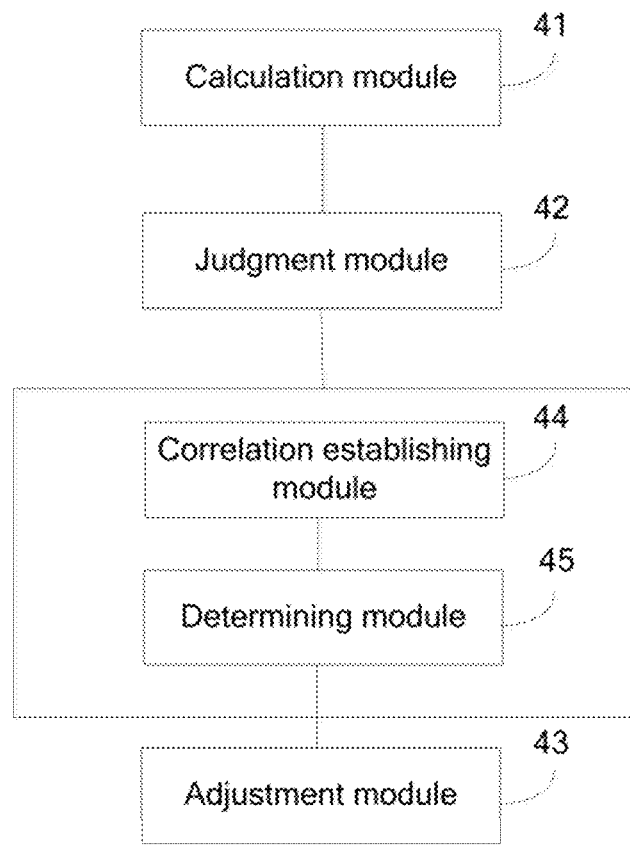
FIG. 6 is a structural block diagram illustrating a heating adjustment device according to an exemplary embodiment.

FIG. 6 is a block diagram illustrating a heating adjustment device according to an exemplary embodiment. As shown in FIG. 6, on the basis of the embodiment shown in FIG. 4, the device may further include a correlation establishing module 44 and a determining module 45.

The correlation establishing module 44 establishes a positive correlation between the average indoor temperature of the cell and an outdoor temperature, the water pump flow and the water temperature based on historical data stored in a database; the determining module 45 determines an adjustment amount of at least one of the water pump flow and the water temperature according to the current outdoor temperature and the positive correlation established by the correlation establishing module.

The adjustment module 43 adjusts the water pump flow and/or the water temperature quantitatively according to the determined adjustment amount.

By adjusting the water pump flow and/or the water temperature quantitatively, the fine adjustment and control of the heating device is realized, and the energy waste caused by repeated fine adjustment is avoided.

In an embodiment, the database may be composed of outdoor temperature and indoor temperature data recorded by existing smart air conditioning big data, and combined with water pump flow statistical data and water temperature statistical data.

In an embodiment, the above heating adjustment device may be included in a server of a heating system. The system further includes a smart air conditioner with a wireless communication module, such as a WiFi module, which can send the obtained indoor temperature information of the dwelling unit to the heating adjustment device. The system further includes a water pump on which a flow meter and a temperature sensor are installed, and the heating adjustment device can obtain the water pump flow and the water temperature through a communication module on the water pump, such as the WiFi module. The server can determine the adjustment amount of the water pump flow and/or the water temperature according to the current average indoor temperature and outdoor temperature data. In addition, corresponding relationships among the water pump flow, the water temperature, the average indoor temperature and outdoor temperature can be counted into the database, which is convenient for modeling and analyzing the correlations among these parameters.

In an embodiment, the heating adjustment device further includes a display module configured to display one or more of the real-time outdoor temperature, the average indoor temperature of the cell, the water pump flow and the water temperature.

Through the visual display of the display module, it is convenient for the staff to obtain main heating parameters of the cell in time.

In an embodiment, when the water pump flow and/or the water temperature of the cell exceeds the threshold value, but the average indoor temperature of the cell still exceeds the standard temperature range, it is determined that the heating of the cell is faulty, the fault information and the location of the cell are displayed on the display module, so that the staff can check the fault in time.

In an embodiment, when the average temperature of the cell is normal, but the difference between the indoor temperature of a dwelling unit in the cell and the average indoor temperature of the cell exceeds a threshold value, it is determined that the heating system of the dwelling unit has a fault, the fault information and the location of the dwelling unit are displayed on the display module, so that the staff can check the fault in time.

Each module in the heating adjustment device provided above may be a hardware module or a software module.

The heating adjustment device provided by the present disclosure may further include a processor and a memory, wherein the memory stores instructions which can be read and executed by the processor, and the processor is configured to execute steps in various embodiments of the method described above.

According to the heating adjustment method and device provided by the present disclosure, when it is determined that the average indoor temperature of the current cell is abnormal, the temperature of the cell is restored to a standard value by adjusting the water pump flow and the water temperature supplied to the cell, and thus the response speed is fast, the reliability is high, the user experience is improved, and energy is saved.

It should be understood that, the present disclosure is not limited to the flowchart and structures described above and shown in the accompanying drawings, and various modifications and changes may be made without departing from the scope. The scope of the present disclosure is limited only by the appended claims.

What is claimed is:

1. A heating adjustment method, comprising:
    calculating an average indoor temperature of a cell, wherein the average indoor temperature of the cell is an average value of a real-time indoor temperature of each dwelling unit in the cell;
    judging whether the average indoor temperature is within a standard temperature range; and
    adjusting at least one of a water pump flow and a water temperature supplied to the cell based on a relationship between the average indoor temperature and the standard temperature range,
    wherein the adjusting at least one of the water pump flow and the water temperature supplied to the cell comprises:
    establishing a positive correlation between the average indoor temperature of the cell and an outdoor temperature, the water pump flow and the water temperature based on historical data stored in a database;
    determining an adjustment amount of at least one of the water pump flow and the water temperature according to the current outdoor temperature and the positive correlation; and
    adjusting at least one of the water pump flow and the water temperature quantitatively according to the determined adjustment amount.

2. The method according to claim 1, wherein the calculating the average indoor temperature of the cell comprises:
    obtaining the real-time indoor temperature of each dwelling unit in the cell collected by a wireless communication module in a smart air conditioner; and
    calculating the average indoor temperature of the cell according to the real-time indoor temperature of each dwelling unit.

3. The method according to claim 1, wherein the outdoor temperature is obtained by the following steps:
    determining a geographical location of the cell; and
    obtaining meteorological data corresponding to the geographical location,
    wherein temperature information contained in the meteorological data is the outdoor temperature.

4. The method according to claim 1, wherein the outdoor temperature is obtained by the following steps:
    determining a geographical location of the cell; and
    obtaining weather forecast information corresponding to the geographical location, and determining the outdoor temperature in a preset duration in the future based on the weather forecast information.

5. The method according to claim 1, further comprising:
determining whether at least one of the water pump flow and the water temperature supplied to the cell exceeds a corresponding preset threshold value when the average indoor temperature is not within the standard temperature range; and
sending an alarm prompt when at least one of the water pump flow and the water temperature supplied to the cell exceeds the corresponding preset threshold value.

6. The method according to claim 1, further comprising:
calculating a difference between the real-time indoor temperature of each dwelling unit in the cell and the average indoor temperature of the cell; and
sending an alarm prompt when an absolute value of the difference is greater than or equal to a preset threshold value.

7. A heating adjustment device, comprising:
a processor; and
a memory for storing instructions executable by the processor;
wherein the processor is configured to:
calculate an average indoor temperature of a cell, wherein the average indoor temperature of the cell is an average value of a real-time indoor temperature of each dwelling unit in the cell;
judge whether the average indoor temperature is within a standard temperature range;
establish a positive correlation between the average indoor temperature of the cell and an outdoor temperature, a water pump flow and a water temperature based on historical data stored in a database;
determine an adjustment amount of at least one of the water pump flow and the water temperature according to the current outdoor temperature and the positive correlation; and
adjust at least one of the water pump flow and the water temperature supplied to the cell when the average indoor temperature is not within the standard temperature range quantitatively according to the determined adjustment amount.

8. The device according to claim 7, wherein the processor is further configured to:
obtain the real-time indoor temperature of each dwelling unit in the cell collected by a wireless communication module in a smart air conditioner; and
calculate the average indoor temperature of the cell according to the real-time indoor temperature of each dwelling unit.

9. The device according to claim 7, wherein the processor is further configured to:
determine a geographical location of the cell; and
obtain meteorological data corresponding to the geographical location, wherein temperature information contained in the meteorological data is the outdoor temperature.

10. The device according to claim 7, wherein the processor is further configured to:
determine a geographical location of the cell; and
obtain weather forecast information corresponding to the geographical location, and determining the outdoor temperature in a preset duration in the future based on the weather forecast information.

11. The device according to claim 7, wherein the processor is further configured to:
determine whether at least one of the water pump flow and the water temperature supplied to the cell exceeds a corresponding preset threshold value when the average indoor temperature is not within the standard temperature range; and
send an alarm prompt when at least one of the water pump flow and the water temperature supplied to the cell exceeds the corresponding preset threshold value.

12. The device according to claim 7, wherein the processor is further configured to:
calculate a difference between the real-time indoor temperature of each dwelling unit in the cell and the average indoor temperature of the cell; and
send an alarm prompt when an absolute value of the difference is greater than or equal to a preset threshold value.

13. A non-transitory computer-readable storage medium comprising instructions that, when executed by a processor of a heating adjustment device, cause the heating adjustment device to perform a method comprising:
calculating an average indoor temperature of a cell, wherein the average indoor temperature of the cell is an average value of a real-time indoor temperature of each dwelling unit in the cell;
judging whether the average indoor temperature is within a standard temperature range; and
adjusting at least one of a water pump flow and a water temperature supplied to the cell based on a relationship between the average indoor temperature and the standard temperature range,
wherein the adjusting at least one of the water pump flow and the water temperature supplied to the cell comprises:
establishing a positive correlation between the average indoor temperature of the cell and an outdoor temperature, the water pump flow and the water temperature based on historical data stored in a database;
determining an adjustment amount of at least one of the water pump flow and the water temperature according to the current outdoor temperature and the positive correlation; and
adjusting at least one of the water pump flow and the water temperature quantitatively according to the determined adjustment amount.

* * * * *